Dec. 31, 1940.  J. L. JOHNSON  2,227,348
FLUE BEAD CUTTING MACHINE
Filed Oct. 26, 1938  2 Sheets-Sheet 2
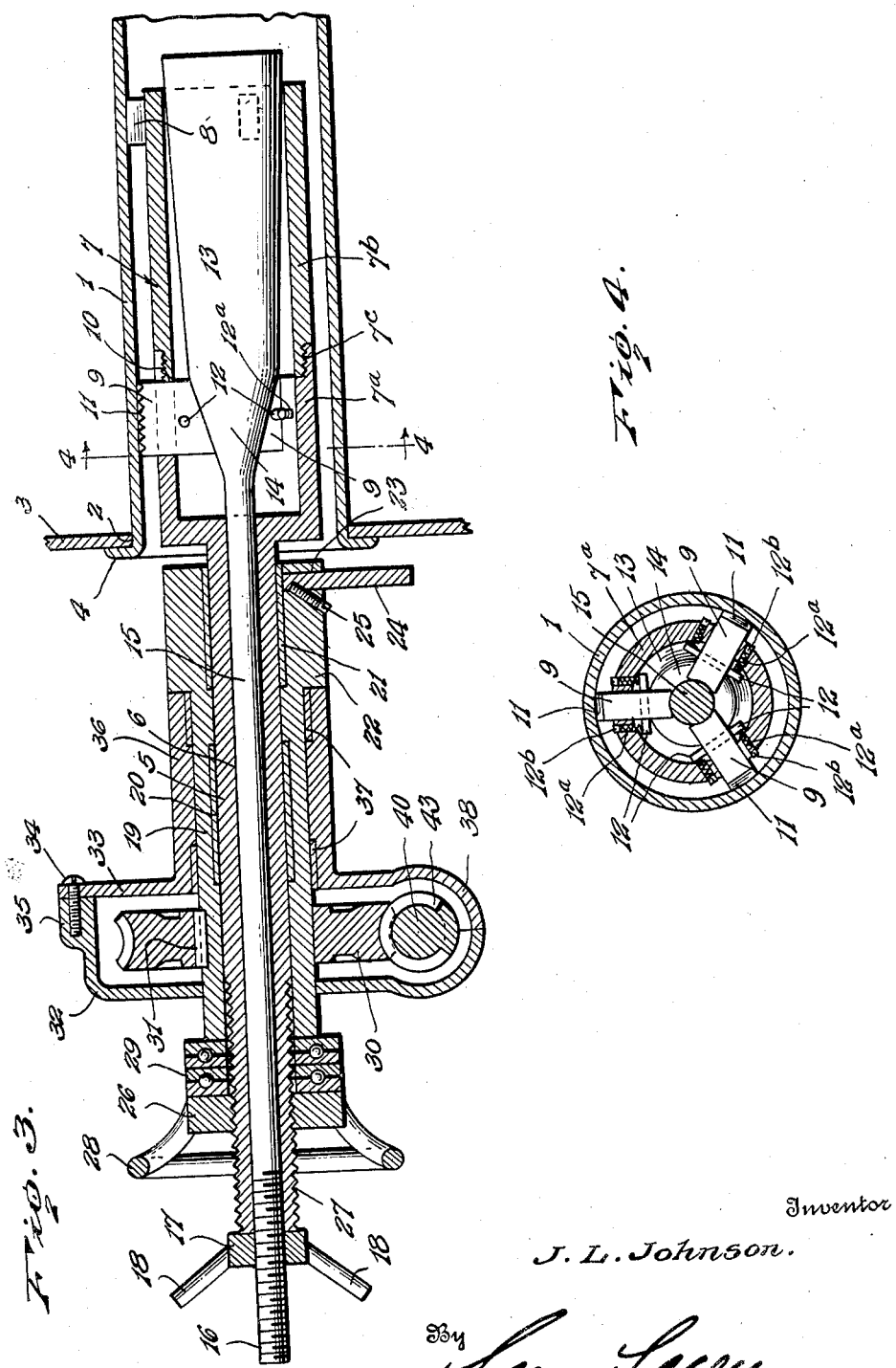
Inventor
J. L. Johnson.
By Lacey & Lacey, Attorneys Patented Dec. 31, 1940

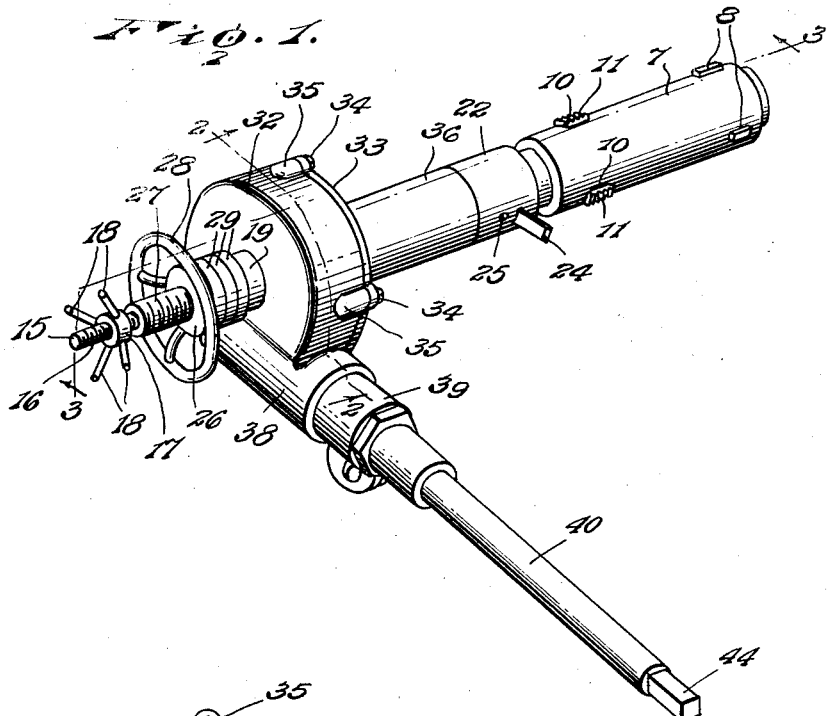
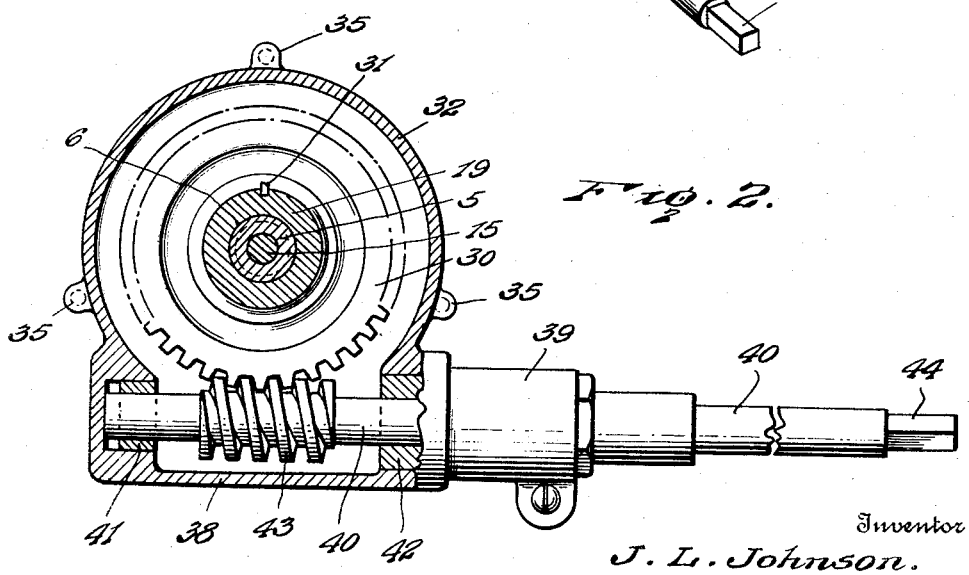

2,227,348

UNITED STATES PATENT OFFICE 2,227,348

FLUE BEAD CUTTING MACHINE

Jesse Lee Johnson, Pettus, Tex.

Application October 26, 1938, Serial No. 237,103

5 Claims. (Cl. 30—93)

This invention relates to a flue bead cutting machine, and it is one object of the invention to provide a machine of this character by means of which a bead at an end of a boiler flue may be very easily cut off when a flue is to be removed and a new flue substituted in place thereof.

It is another object of the invention to provide a bead cutter so constructed that it may be mounted in axial relation to a flue and a cutter carrying portion disposed externally of the flue rotated so that the bead of the tube will be progressively shaved off and eventually entirely removed.

Another object of the invention is to provide a bead cutter having a portion adapted to be thrust into a boiler tube from one end thereof and carrying gripping means consisting of dogs shiftable radially of the tube into gripping engagement therewith by a spreading member having actuating means disposed at the outer end of the device where it may be very easily operated.

Another object of the invention is to provide a bead cutting machine wherein the carrier for the cutting blade is rotatably mounted upon a spindle or shank extending outwardly from a boiler tube axially thereof and adapted to be shifted longitudinally of the spindle while being rotated so that the cutter blade will be fed towards a bead during a cutting operation.

It is another object of the invention to provide a bead cutter which is of compact construction, very easy to operate and not liable to be damaged if roughly handled.

The invention is illustrated in the accompanying drawings, wherein:

Figure 1 is a perspective view of the improved bead cutting machine.

Figure 2 is a view taken along the line 2—2 of Figure 1,

Figure 3 is a sectional view taken longitudinally through the bead cutting machine upon the line 3—3 of Figure 1 and showing the machine in position for use, and Figure 4 is a transverse sectional view taken along the line 4—4 of Figure 3.

The tube of a boiler extends longitudinally therein between the boiler plates or bulk heads and end portions of the tube passed through openings formed in the boiler plates where they are secured by rolling protruding ends of the tube outwardly to form beads which have contacting engagement with the outer faces of the boiler plates and not only hold the tube in place but also form tight joints about the same to prevent leakage. When a boiler tube is worn out and must be replaced, one or both of its beads must be removed in order that it may be shifted longitudinally out of place, and the machine constituting the subject-matter of this invention is employed to cut the beads from the boiler tube. One of the tubes, which is indicated by the numeral 1, is shown in Figure 3, and upon referring to this figure, it will be seen that the end of the boiler tube passes through an opening 2 formed in a boiler plate or bulk head 3, the protruding end of the tube being flared and bent outwardly to form a circumferentially extending outstanding bead 4 having close contacting engagement with the outer face of the boiler plate 3 to hold the tube in place and form a tight joint about the boiler tube. Each end of the boiler tube is secured through the companion boiler plate in the same manner.

The machine, by means of which the flanges 4 of the boiler tube are to be removed, has a spindle 5 formed with a longitudinally extending bore 6. A cylindrical mounting member 7 extends longitudinally from the spindle at the inner end thereof and at its open end carries a plurality of lugs 8 extending radially from the mounting member and spaced from each other circumferentially thereof. While three of the lugs are preferably provided, any number desired may be used. These lugs are intended to slide easily into and out of the boiler tube and have contacting engagement with the inner surface of walls thereof so that the mounting will be centered with respect to the axis of the boiler tube. It will thus be seen that the mounting may be easily thrust into the tube to be removed and supported in concentric relation thereto while it is being secured.

In order to secure the cylindrical mounting within the boiler tube, there have been provided dogs 9 which are preferably three in number and are spaced from each other circumferentially of the mounting. These dogs extend radially of the mounting and are slidably engaged through openings 10 formed in the forward portion 7a thereof, the rear portion 7b being then screwed into threaded engagement with the front section, as shown at 7c to close rear ends of the slots 10. The dogs are formed of very hard metal and at their outer ends are formed with teeth 11 so that they may have biting engagement with the boiler tube and firmly grip the same when forced outwardly through the slots. A pin 12 passes through each dog with its ends projecting from opposite sides thereof, as shown in Figure 4, to limit outward movement of the dogs and prevent them from dropping outwardly through the openings 10 and becoming lost when the device is not in use. Springs 12ª which are held under tension by screws 12ᵇ engage end portions of the pins to yieldably resist outward movement of the dogs and normally hold them retracted so that they will not accidentally slide outwardly and interfere with thrusting of the device into a boiler tube.

A spreader 13, which is tapered longitudinally and has a conical-shaped forward end portion 14, extends longitudinally in the mounting 7 with its conical end portion engaging inner ends of the dogs 9, and inner ends of the dogs are grooved, as shown in Figure 4, in order that they may have good contacting engagement with the spreader and be firmly held in an extended position in gripping engagement with the boiler tube when they are forced outwardly. A shank or stem 14, which is of an even diameter throughout its length, extends forwardly from the spreader 13 and is snugly received in the bore 6 of the spindle 5. The outer or forward end portion of this stem or shank is threaded, as shown at 16, to receive a nut or block 17, and when this nut or block is disposed in abutting engagement with the forward end of the spindle, as shown in Figure 3, and turned by grasping the spokes 18, the stem or shank 15 will be drawn outwardly or forwardly so that the conical portion of the spreader will act against inner ends of the dogs and force the dogs into tight gripping engagement with the boiler tube. As the dogs will be simultaneously shifted outwardly into gripping engagement with the boiler tube, the mounting will be firmly secured in concentric relation to the boiler tube, and the spindle will be mounted concentric to the longitudinal axis of the boiler tube.

A sleeve 19 is rotatably carried by the spindle 5, and in order that this sleeve may turn freely about the spindle, there have been provided bushings 20 and 21 serving as bearings for the sleeve. The inner or rear end portion of the sleeve is externally thickened to form a head 22, and through this head is formed a radially extending opening or socket 23 in which a cutter blade 24 is secured by a screw 25. When it is necessary to sharpen or replace the cutter blade, it is merely necessary to loosen the screw and the blade may be removed. This blade projects radially from the head 22 of the sleeve, and when the sleeve is turned, the cutter blade moves in a circular path. From an inspection of Figure 3, it will be readily understood that by shifting the sleeve along the spindle towards the mounting 7, the cutter blade may be moved into position to act upon the outstanding bead 4 of the boiler tube and shave this bead off during rotation of the sleeve until the bead is entirely removed. When the bead is entirely removed, the boiler tube may be shifted longitudinally out of the boiler. A block 26 constituting means for feeding the sleeve longitudinally of the spindle towards the mounting 7 is carried by the threaded outer or forward end portion 27 of the spindle and provided with a large turning wheel 28, by means of which it may be easily turned. Thrust bearings 29 are provided about the spindle between the block 26 and the outer or forward end of the sleeve 19 in order that the block 26 may be easily turned and force the sleeve along the spindle.

In order to impart rotary motion to the sleeve 19 and effect movement of the cutter blade in a circular path about the bead 4, there has been provided driving means including a worm gear 30 which fits about the sleeve and is secured thereto by a key 31. This worm gear is enclosed in a housing 32 which fits snugly about the spindle and at its inner or rear side is closed by a removable wall 33 which is secured by screws 34 passed through openings formed in marginal portions thereof and engaged in sockets 35 of the housing 32. A tubular shank or neck 36 extends from the wall 33 and fits snugly about the sleeve 19, and in order that the sleeve may turn freely in the neck, there have been provided bushings 37 serving as bearings. In view of the fact that side walls of the housing are spaced from opposite sides of the worm gear 30, the sleeve may be shifted longitudinally through the housing and its neck for shifting the cutter blade towards the bead to be cut off while holding the housing stationary. If so desired, the housing and its neck may be allowed to move with the sleeve during longitudinal adjustment of the sleeve. A cylindrical extension 38 extends along the lower portion of the gear housing and has one end portion 39 projecting from the housing. A drive shaft 40 is rotatably mounted in the extension or shaft housing 38 through bearings 41 and 42, and this shaft carries a worm 43 which meshes with the worm gear 30 so that, when the drive shaft is turned through the medium of a crank or a power drive device engaged with the flared outer end of the drive shaft, rotary motion will be transmitted to the sleeve to impart cutting movement to the cutter blade 24.

When this tube bead cutter is in use for removing the bead 4 from a boiler tube 1, the head 7 of the spindle 5 is thrust into the tube to the position shown in Figure 3, and the nut or block 17 then turned in a direction to draw the spreader 13 outwardly and cause its conical end portion 14 to act upon inner ends of the dogs and shift these dogs outwardly into position to grip walls of the boiler tube and firmly secure the spindle in axial alinement with the tube. The block 26 is then turned in a direction to shift the sleeve along the spindle towards the boiler tube, and since the sleeve is rotated about the spindle, the cutter blade will be moved in a circular path and as it engages the bead 4 a cutting or shaving action will take place which will very effectively cut away the bead until the bead is entirely removed. By turning the block 26 the sleeve may be progressively fed towards the tube during this cutting action. After the bead has been entirely removed, the nut or block 17 will be turned in a direction to permit inward movement of the stem 15 and the spreader 13 and the dogs will then be released and permitted to shift inwardly through the opening 10 of the head 7 so that the device may be withdrawn from the boiler tube. The boiler tube may then be removed from the boiler and a new tube installed.

Having thus described the invention, what is claimed as new is:

1. A boiler bead remover comprising a spindle formed with a longitudinal bore, an enlarged head formed on said spindle and of a diameter adapting it to fit within a tube, dogs carried by said head and shiftable radially thereof, a spreader in said head having a stem extending through the bore of said spindle, means for drawing the spreader outwardly for shifting the dogs radially of the head and holding the dogs in gripping engagement with the tube and mounting the spindle concentric to the longitudinal axis of the tube, means carried by said spindle for cutting away the bead of the boiler tube, and means for shifting the last-mentioned means along the spindle into position for cutting away the bead.

2. A boiler tube bead cutter comprising a spindle formed with a longitudinally extending bore, an enlarged head formed on and extending from the inner end of said spindle and of a diameter adapting it to fit within a boiler tube, a tapered spreader shiftable longitudinally in said head, a stem for said spreader extending through the bore of said spindle and having a threaded end portion projecting beyond the outer end thereof, dogs carried by said head and shiftable radially thereof, said dogs having their inner ends engaging said spreader, a nut threaded upon the outer end portion of said stem and engaging the outer end of said spindle for drawing the stem outwardly and shifting the cutter longitudinally in said head to force the dogs outwardly and hold the same in gripping engagement with walls of a boiler tube in which the head is disposed, means carried by said spindle for acting upon and removing the bead of the boiler tube, and means for shifting the last-mentioned means along said spindle in position to act upon the bead.

3. A boiler tube bead removing device comprising a spindle, means for mounting said spindle in axial alinement with a boiler tube, a sleeve rotatable about said spindle and shiftable longitudinally thereon, a cutter extending radially from the inner portion of said sleeve, a gear housing fitting loosely about said sleeve, a worm gear carried by said sleeve within said gear housing, a drive shaft extending into said gear housing and rotatably mounted, and a worm carried by said drive shaft within the gear housing and meshing with said worm gear for imparting rotary motion to said sleeve.

4. A boiler tube bead remover comprising a spindle, means for mounting the spindle in axial alinement with a boiler tube, a sleeve rotatable about said spindle and shiftable longitudinally thereon, the inner end portion of said sleeve being externally thickened to form a head, a cutter blade carried by said head and extending radially therefrom, a gear housing fitting loosely about said sleeve, a removable side wall for said gear housing, a neck extending from the removable side wall and rotatably fitting about said sleeve with one end abutting the head of the sleeve, a worm gear carried by said sleeve within said gear housing, said gear housing having a lower portion constituting a shaft housing projecting from the gear housing, a drive shaft rotatably mounted through said shaft housing and projecting outwardly therefrom for engagement with turning means, and a worm carried by said drive shaft within the shaft housing and meshing with the worm gear for transmitting rotary motion to said sleeve.

5. A boiler tube bead remover comprising a spindle formed with a longitudinal bore, a head carried by said spindle and being of a diameter adapting it to fit within a boiler tube, said head having front and rear sections detachably connected and the front section having slots leading from its rear end and at their rear ends being closed by the rear section, dogs slidable through said slots radially of the head, pins projecting from opposite sides of inner end portions of said dogs for limiting outward movement thereof, springs engaging said pins and yieldably resisting outward movement of the dogs, a spreader in said head having a stem extending through the bore of said spindle, means for drawing the spreader outwardly and shifting the dogs outwardly into position for gripping the boiler tube, cutting means carried by said spindle, and means for shifting the cutting means along the spindle into position for cutting away the bead of the boiler tube.

JESSE LEE JOHNSON.